United States Patent
Jarett (10) Patent No.: US 7,978,641 B2
(45) Date of Patent: Jul. 12, 2011

(54) HYBRID TDM/FDM UPLINK FOR SPOT-BEAM COMMUNICATION SYSTEM

(75) Inventor: Keith Jarett, Lafayette, CA (US)

(73) Assignee: The Boeing Company, Chicago, IL (US)

(*) Notice: Subject to any disclaimer, the term of this patent is extended or adjusted under 35 U.S.C. 154(b) by 1969 days.

(21) Appl. No.: 10/414,864

(22) Filed: Apr. 16, 2003

(65) Prior Publication Data

US 2003/0202529 A1  Oct. 30, 2003

Related U.S. Application Data

(60) Provisional application No. 60/376,382, filed on Apr. 29, 2002.

(51) Int. Cl.
*H04W 4/00* (2009.01)
(52) U.S. Cl. .................... 370/316; 370/330; 370/437
(58) Field of Classification Search .................. 370/315, 370/316, 328, 329, 330, 436, 468
See application file for complete search history.

(56) References Cited

U.S. PATENT DOCUMENTS

| | | | | |
|---|---|---|---|---|
| 5,790,070 A | * | 8/1998 | Natarajan et al. | 342/354 |
| 6,157,621 A | * | 12/2000 | Brown et al. | 370/310 |
| 6,282,179 B1 | * | 8/2001 | Sherman | 370/320 |
| 2003/0026356 A1 | * | 2/2003 | Brommer | 375/324 |
| 2003/0163822 A1 | * | 8/2003 | Knutson et al. | 725/68 |
| 2003/0206134 A1 | * | 11/2003 | Lier et al. | 342/368 |

* cited by examiner

*Primary Examiner* — Brian D Nguyen
(74) *Attorney, Agent, or Firm* — Gates & Cooper LLP (57) ABSTRACT

A method, apparatus for uplinking data is disclosed. The apparatus comprises a plurality of receive antennae, independently directable to a plurality of ground stations, each disposed in one of a plurality of cells; a time domain concentrator, communicatively coupled to the plurality of receive antennae, the time domain concentrator for selectably directing each of the plurality of receive antennae to one or more of the plurality of cells, and for concatenating each of the uplink transmissions in a time domain; and a frequency domain concentrator, communicatively coupled to the time domain concentrator, for concatenating the uplink transmissions in a frequency domain.

25 Claims, 5 Drawing Sheets

HYBRID TDM/FDM UPLINK FOR SPOT-BEAM COMMUNICATION SYSTEM

CROSS-REFERENCE TO RELATED APPLICATIONS

This application claims benefit of U.S. Provisional Patent Application No. 60/376,382, entitled "HYBRID TDM/FDM UPLINK FOR SPOT-BEAM COMMUNICATION SYSTEM," by Keith Jarett, filed Apr. 29, 2002, which application is hereby incorporated by reference herein.

This application is related to the following co-pending and commonly assigned patent application(s), all of which applications are incorporated by reference herein:

U.S. Provisional Application Ser. No. 60/376,105, entitled "SECURE DATA CONTENT DELIVERY SYSTEM FOR MULTIMEDIA APPLICATIONS UTILIZING BANDWIDTH EFFICIENT MODULATION", by Charles F. Stirling, Bernard M. Gudaitis, William G. Connelly, and Catherine C. Girardey, filed Apr. 29, 2002; and U.S. Provisional Application Ser. No. 60/376,244, entitled "METHOD TO SECURELY DISTRIBUTE LARGE DIGITAL VIDEO/DATA FILES WITH OPTIMUM SECURITY," by Ismael Rodriguez and James C. Campanella, filed Apr. 29, 2002;

U.S. Utility patent application Ser. No. 10/213,396, filed Aug. 6, 2002, by inventor Joseph S. Ng, entitled "BANDWIDTH-EFFICIENT AND SECURE METHOD TO COMBINE MULTIPLE LIVE EVENTS TO MULTIPLE EXHIBITORS," (now abandoned) which itself claims the benefit of U.S. Provisional Patent Application Ser. No. 60/376,333, filed Apr. 29, 2002, by inventor Joseph S. Ng, entitled "BANDWIDTH EFFICIENT AND SECURE METHOD TO COMBINE MULTIPLE LIVE EVENTS TO MULTIPLE EXHIBITORS";

U.S. Utility patent application Ser. No. 10/178,602, filed Jun. 24, 2002, by inventor Michael A. Enright, entitled "METHOD AND APPARATUS FOR DECOMPRESSING AND MULTIPLEXING MULTIPLE VIDEO STREAMS IN REAL-TIME", (now abandoned) which claims the benefit of U.S. Provisional Patent Application Ser. No. 60/376,254, filed Apr. 29, 2002, by inventor Michael A. Enright, entitled "METHOD TO DECOMPRESS AND MULTIPLEX MULTIPLE VIDEO STREAMS IN REAL-TIME";

U.S. Provisional Patent Application Ser. No. 60/376,087, filed Apr. 29, 2002, by inventor Mary A. Spio, entitled "METHODOLOGY FOR DISPLAY AND DISTRIBUTION OF LIVE CINEMA GRADE CONTENT IN REAL TIME";

U.S. Utility patent application Ser. No. 10/360,019, filed Feb. 7, 2003, by inventors Joseph S. Ng and Robyn M. Akers, entitled "COMBINING MULTIPLE SIMULTANEOUS SOURCE CINEMA TO MULTIPLE EXHIBITOR RECEIVERS", which claims the benefit of U.S. Provisional Patent Application Ser. No. 60/376,240, filed Apr. 29, 2002, by inventors Joseph S. Ng and Robyn M. Akers, entitled "COMBINING MULTIPLE SIMULTANEOUS SOURCE CINEMA TO MULTIPLE EXHIBITOR RECEIVERS";

U.S. Utility patent application Ser. No. 10/172,214, entitled "COMPACT HIGH-POWER BEAM HOPPING SWITCH NETWORK" by Keith Jarett and Andrew H. Kwon, filed Jun. 13, 2002, which application is hereby incorporated by reference herein U.S. Provisional Patent Application Ser. No. 60/376,243, filed Apr. 29, 2002, by inventors Bernard Mark Gudaitis and William G. Connelly, entitled "ARCHITECTURE CONTAINING EMBEDDED COMPRESSION AND ENCRYPTION ALGORITHMS WITHIN THE DATA FILE."

BACKGROUND OF THE INVENTION

1. Field of the Invention

The present invention relates to systems and methods for communicating data, and in particular to a system and method for uplinking data using a hybrid multiplexing scheme.

2. Description of the Related Art

Modern satellites often employ a large number of narrow spot beams, often in a beam laydown that forms a cellular coverage of a wide geographic area. In addition to providing better performance, the narrow beams allow spatial re-use of the same frequency or time slot, so that the total throughput bandwidth of the satellite can be several times the allocated frequency band. Because the traffic demand is not equal for all the cells, it would be wasteful to allocate the same amount of bandwidth to each cell. Therefore, satellite systems typically use either Time Division Multiplexing (TDM) or frequency division multiplexing (FDM).

In TDM, each cell is allocated a slice of a "frame" of time, with the allocation repeating once per frame. The TDM approach is best illustrated by the large-terminal TDMA trunking systems such as those operated by INTELSAT. But these systems use regional beams or isolated spot beams, and these beams have much smaller traffic ratios than 100 to 1.

In FDM, each cell is allocated a slice of the total bandwidth. In either TDM or FDM, the allocation is intended to match the communication needs (throughput, etc.) of the traffic in that cell.

The FDM approach can be illustrated by the BEAMLINK system available from COMDEV. The system includes a static switch that directs each incoming cell to one or more of a bank of surface acoustic wave (SAW) filters. Each SAW filter passes a specific band of frequencies. SAW filters are grouped into banks, each of which in aggregate covers the full operating band. Within each bank, the outputs of the SAW filters are combined to obtain a composite signal that spans the full operating band. This signal can then be fed to a digital processor or transmitted to a large Gateway Earth station for demodulation of the individual signals.

The SPACEWAY system provides another illustration of the FDM approach to uplink capacity allocation. The SPACEWAY satellite has a static switch that directs each uplink cell to one or more A/D converters. Each A/D converter accepts a slice of frequencies. For SPACEWAY, the analog-to-digital (A/D) converter output is demodulated and processed onboard the satellite.

In a satellite or stratospheric platform system that covers a wide geographic area with a laydown of overlapping cells, the average traffic in each cell is roughly proportional to the user population within that cell. Cells which cover remote, unpopulated areas generally have far less traffic than cells that cover urban areas. The ratio between highest and lowest traffic cells can exceed 100 to 1. Handling rural cells requires A/D conversion of largely empty uplink bands. Further, because very narrow filters are difficult to implement, satellite systems using FDM have difficulty matching their allocations to such disparate requirements. In contrast, TDM systems can easily allocate very small fractions of time to those (typically rural) cells with light traffic.

This is not a problem for transmissions from the satellite to the ground (downlink transmissions), since the satellite can allocate power among all the cells it is serving, and can use its transmission power for other cells during the rest of the TDM frame. However, the ground station transmitter must be sized according to the instantaneous, or burst, data rate, even though this capability is used only a small fraction of the time. For example, the ground system might require a 100-watt transmitter operating during the 1% of the time that the satellite is "looking at" the cell. If the satellite were "looking at" the rural cell 100% of the time, a 1-watt transmitter could do the same job at much lower cost. However, while the satellite is "looking at" this cell and receiving the low power, lower data rate signal, the satellite cannot use the same assets to receive higher data rate signals from higher power transmitters in other cells. Hence, "looking at" or dwelling on cells with few ground stations transmitting low power signals for extended period of time results in a substantial waste in satellite communication throughput capacity.

Neither BEAMLINK nor the SPACEWAY systems are capable of efficiently handling anything approaching a 100 to 1 ratio of traffic between urban and rural cells. These systems can at best accommodate ratios up to 10 to 1 before they begin wasting capacity on rural cells.

What is needed is a system and method to reduce ground terminal transmitter power requirements, while efficiently utilizing the satellite resource. The present invention satisfies that need.

SUMMARY OF THE INVENTION

To address the requirements described above, the present invention discloses a method and apparatus for uplinking data. The method comprises the steps of: selecting a communications channel bandwidth and a communications channel dwell time for receiving the data from a first plurality of ground stations disposed in a first cell; directing one or more of a plurality of receive antennae to the first cell and dwelling the one or more of the plurality of receive antennae on the first cell for the selected dwell time, to receive a first uplink transmission comprising the data from at least one ground station of the first plurality of ground stations disposed in the first cell; and bandfiltering the first uplink transmission by the selected communications channel bandwidth.

The apparatus comprises a plurality of receive antennae, independently directable to a plurality of ground stations, each disposed in one of a plurality of cells; a time domain concentrator, communicatively coupled to the plurality of receive antennae, the time domain concentrator for selectably directing each of the plurality of receive antennae to one or more of the plurality of cells, and for concatenating each of the uplink transmissions in a time domain; and a frequency domain concentrator, communicatively coupled to the time domain concentrator, for concatenating the uplink transmissions in a frequency domain.

The present invention reduces ground terminal transmitter power requirements by using a satellite uplink payload configuration that blends FDM and TDM techniques. Urban beams are assigned both wider time slices and wider frequency bands than rural beams. The present invention allows frequency bandwidth allocated two urban cells to be 10 or more times that of the rural cells, while also allowing the time allocated to urban cells to be 10 or more times that of the rural. This allows the satellite to serve cells which differ in traffic capacity by a factor of 100 or more, which is not practical for either pure FDM or pure TDM systems.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
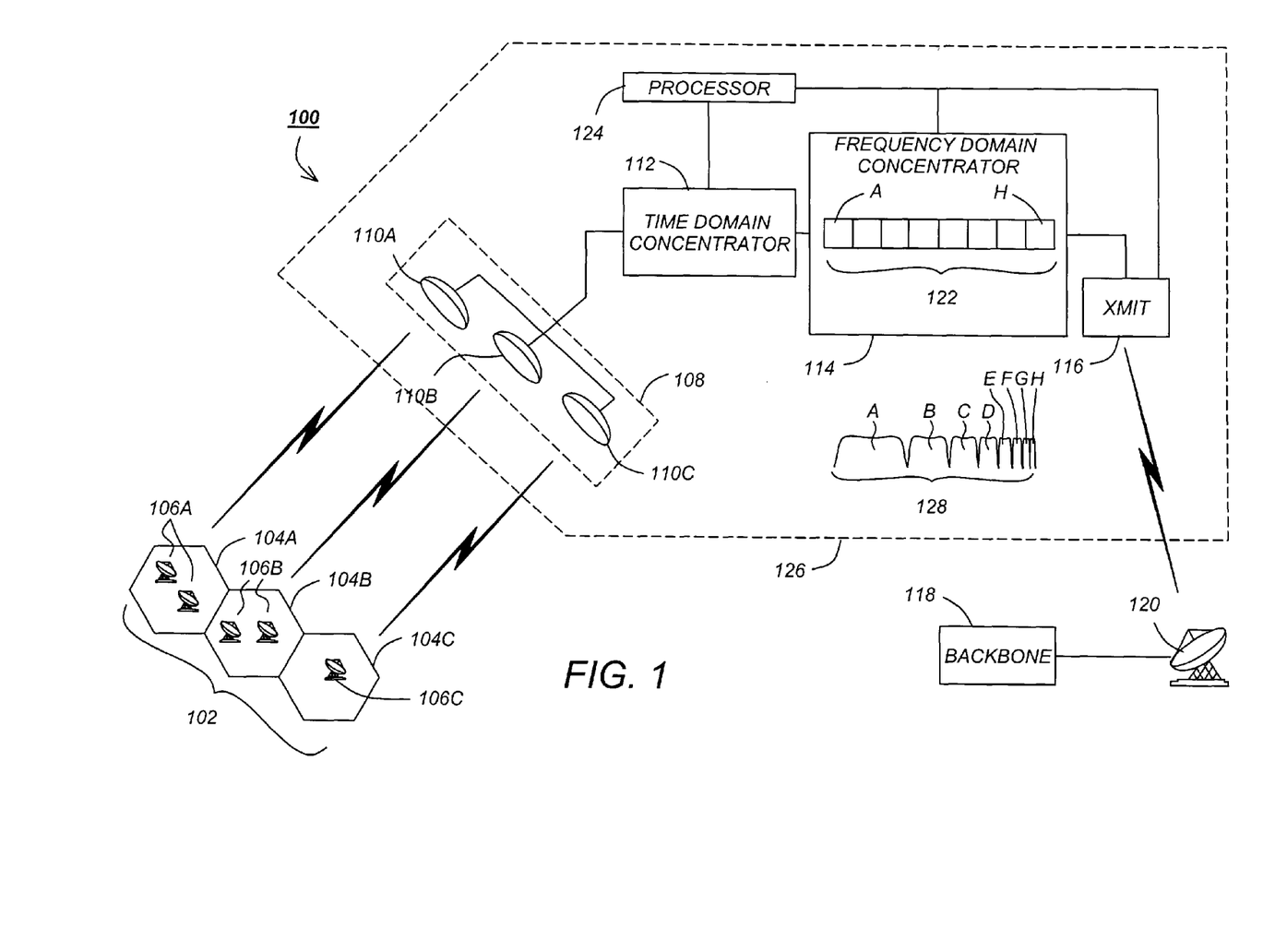
FIG. 1 is a diagram showing an exemplary embodiment of the communication architecture.

FIG. 1 is a diagram showing an exemplary embodiment of the communication system 100 architecture. The communication system 100 comprises an uplink segment 102 that includes a plurality of cells 104A-104C (hereinafter alternatively referred to as cell(s) 104). Each cell 104 includes one or more ground stations 106. The ground stations 106 uplink transmissions, which include uplink data, to a satellite 126.

The satellite 126 receives the uplink transmissions, and transponds the received uplink transmissions to a second ground station 120, such as a Gateway. The Gateway 120 is communicatively coupled to a backbone 118, which provides the Gateway access to other information services, such as the Internet, local area network (LAN), wide area network (WAN).

The satellite 126 comprises a receive antenna array 108, which includes a plurality of receive antennae 110A-110C (hereinafter alternatively referred to as receive antennae 110).

The satellite 126 also comprises a time domain concentrator 112. In one embodiment, the antenna array 108 provides one output from each uplink cell 104 to the time domain concentrator 112. The time domain concentrator 112 combines the signals provided by each of the receive antennae 110 in the antenna array 108 by switching among the signals provided at the output of each receive antenna 110. In one embodiment, the time domain concentrator 112 comprises a beam hopping switch network, which is further illustrated in FIG. 3, and described in the related text.

The foregoing switching operations, as well as many of the other operations performed in the following description can be performed by a communication processor 124 on board the satellite 126. Or, these operations can be commanded and controlled from a ground control station and uplink to the satellite 126.

Information regarding the selected communications channel beamwidth and a communications channel dwell time can be communicated to ground stations 106, the satellite 126, and any other entities requiring this information via an auxiliary channel. The information on the auxiliary channel can be transmitted at pre-selected time slots and frequencies, or time slots and frequencies that change as a function of time. The desired communications channel beamwidth and communications channel dwell time can be determined by balancing service capacity among all users, or by giving priority to certain users as required.

In an alternative embodiment, the beam hopping function is performed by a beam-forming uplink antenna. In this embodiment, the time domain concentrator 112, under the direction and control of the communications processor 124, provides one or more commands to each receive antenna 110A-110C, to orient the boresight of the sensitive axis of the receive antenna at each of the cells 104 as desired. In doing so, the time domain concentrator 112 implement a beam-hopping or beam-agile network.

The time domain concentrator 112 provides the time-division multiplexed signals from the receive array 108 to a frequency domain concentrator 114. The frequency domain concentrator 114 includes a filter bank 122, which has a plurality of bandpass filters 128A-128G. In one embodiment, the bandpass filters comprise one or more contiguous surface acoustic wave (SAW) filters of bandwidths that vary over a factor of approximately 10. Each of the bandpass filters 128A-128G admits signals within its passband and rejects out-of-band signals as noise.

One or more of the time division multiplexed signals from the time domain concentrator 112 are provided to one or more of the filters 128, thus frequency division multiplexing the time division multiplexed signals from the time domain concentrator. As shown in FIG. 1, the filters 128 of the filter bank 122 comprise filters 128 of differing bandwidths. For example, filter 128A has a bandwidth greater than the bandwidth of filters 128B-128H each succeeding filter has a bandwidth less than the filter preceding it. By using different combinations of filters 128, a plurality of possible filter bandwidths can be implemented. The bandpass filters 128B-128H can be implemented as analog filters, or as digital filters as the need requires.

Alternatively, the frequency domain concentrator 114 can comprise a digital channelizer. The digital channelizer comprises a plurality of analog-to-digital (A/D) converters, which convert the signals from the time domain concentrator 112 into digital form, and a processor to digitally excise empty frequency bands and concatenate occupied bands.

The frequency domain concentrator 114 also combines (for example, by concatention), the uplink transmissions provided by the time domain concentrator 112. The resulting output is one or more groups of multiple carriers at close to 100% duty factor. This output is forwarded to a transmitter 116, which transmits the information to the Gateway 120, where the information is processed and routed to the appropriate destination.

In one embodiment, the information is demodulated on board the satellite 126 and demodulated before transmission to the Gateway 120. Another embodiment, the information is transmitted directly to the Gateway 120 where it is demodulated.

Figure 2A:
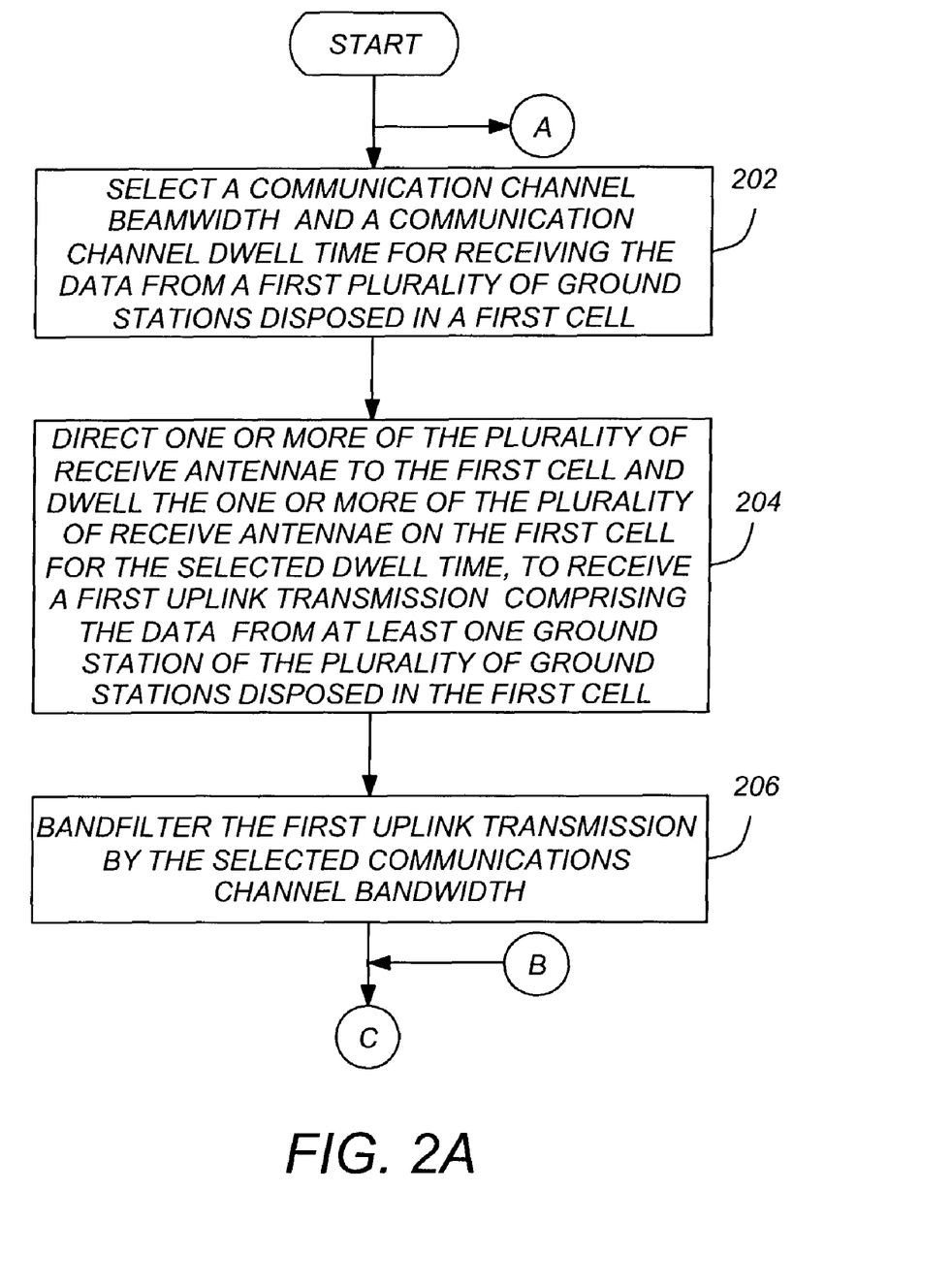
FIGS. 2A-2C are flow chart presenting exemplary process steps that can be used to practice one embodiment of the present invention.
Figure 2B:
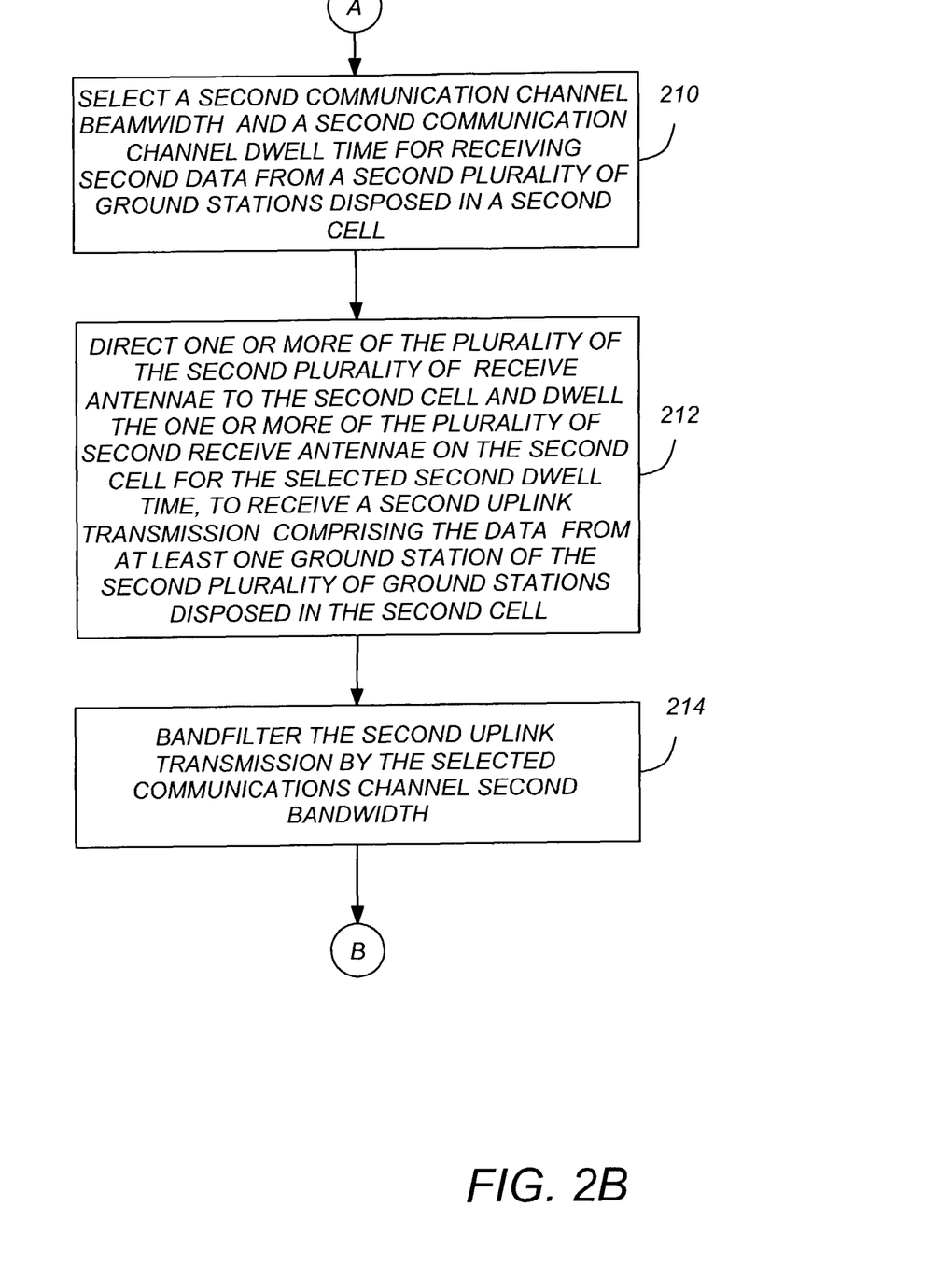
Figure 2C:
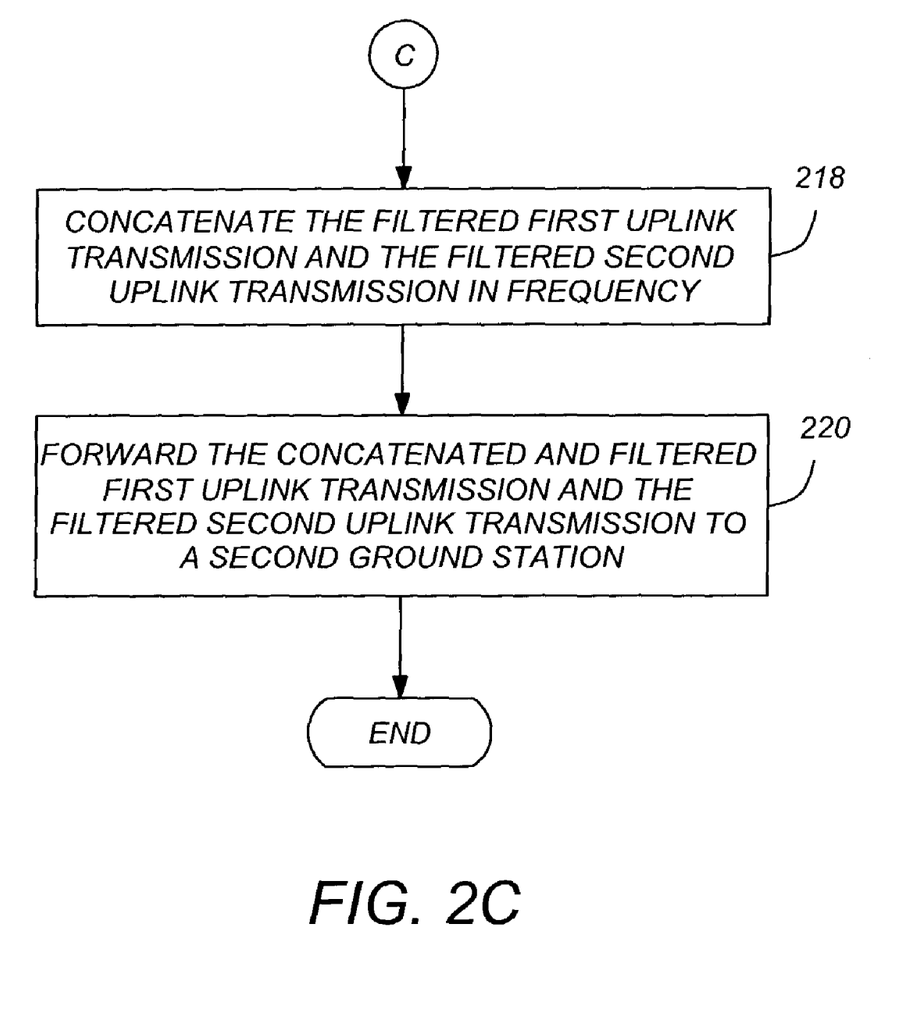

FIGS. 2A-2C are diagrams showing exemplary process steps that can be used to practice one embodiment of the present invention.

Referring first to FIG. 2A, a communication channel beamwidth and a communication channel dwell time is selected, as shown in block 202. The communication channel beamwidth and the communication channel dwell time are selected to receive an uplink transmissions comprising data from a first plurality of ground stations 106A disposed in a first cell 104A. In block 204, one or more of the plurality of receive antenna 110 are directed to the first cell 104A and dwelled in that position for the selected dwell time, thus allowing the uplink signal from the ground stations 106A to be received. In block 206, the uplink transmissions from the cells 106A are bandfiltered to the selected communications channel bandwidth by the frequency domain concentrator 114. In one embodiment, the processes performed in block 206 are performed by providing the uplink transmissions to one or more of the filters 122A-122H of the filter bank 122, wherein the filter(s) 122A-122H are selected to implement the selected communications channel bandwidth.

Referring now to FIG. 2B, blocks 210 through 214 illustrate analogous steps to those shown in blocks 204 through 206 above. However, blocks 210 through 214 show exemplary operations in receiving a second uplink transmission from a second plurality ground stations 106B in a second cell 104B. In block 210, a second communications channel beamwidth and dwell time is selected. In block 212 one or more of the plurality of receive antennae 110 are directed to the second cell 104D for the selected dwell time to receive the second uplink signal. Finally, in block 214, the second uplink transmission is bandfiltered by the selected communications channel second bandwidth.

Typically, the operations shown in blocks 202 through 206 in blocks 210 through 214 occur concurrently, allowing signals to be received from several of the cells 104 to be received at the same time.

Referring now to FIG. 2C, the bandfiltered uplink transmission(s) are combined together, or concatenated, as shown in block 218. In block 220, the concatenated and filtered uplink transmission(s) are forwarded to a second ground stations such as the Gateway 120.

Figure 3:
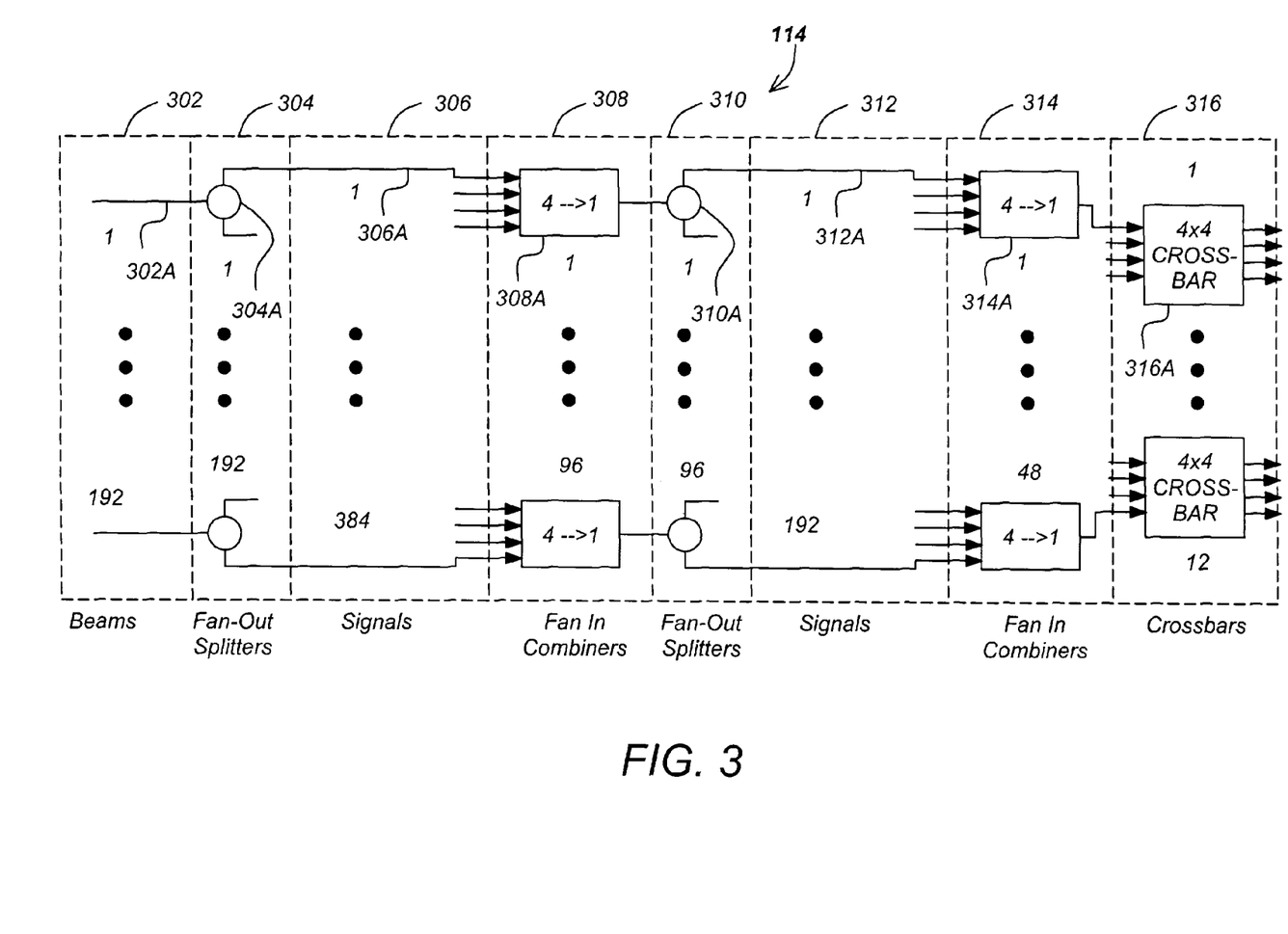
FIG. 3 is a diagram showing one embodiment of the time domain concentrator.

FIG. 3 is a diagram showing one embodiment of the time domain concentrator 114 or uplink beam hopping switch network. In this illustrative example, the array of receive antennae 110 can receive 192 distinct beams. Each beam is split by an array of first fan-out splitters 304, producing, in this example 384 signals. These 384 signals are provided to 96 4:1 fan-in combiners 308, those producing 96 signals.

The output of the fan-in combiners 308 is provided to an array of second fan-out splitters 310, thus producing 192 signals 312. These 192 signals 312 are provided to an array of 4:1 fan-in combiners, thus providing 48 outputs. Next, the output of the second fan-in combiners 314 are provided to a plurality (12) of 4×4 crossbars 316. The plurality of crossbar as 316 permit any of the crossbar 316 inputs to be provided to any of the crossbar 316 output.

By appropriate selection of the first fan-in combiners 308 and a second fan-in combiners 314, the 198 beams 302 can be provided to the output of the switch network 114, as deemed appropriate in order to implement time division multiplexing of the received uplink transmissions.

The beam-hopping switch network first splits each of the inputs into two, both to allow for failures in the first stage of switch junctions and to mitigate blocking. Blocking refers to the fact that setting of the switch junctions to route one signal may interfere with the desired routing of another signal. In the preferred embodiment, each cell belongs to two groups of 8. If the load is heavy in one of these two groups, the cell can be served through its membership in the other group.

It can be seen that the foregoing switch network architecture does not assure that such blocking can never occur. Instead, the foregoing architecture reduces the probability of such blocking to acceptable levels.

The ability to select anytime slot to receive uplink data can also be used to reduce blocking. If a given cell needs service at a 10% duty factor, that 10% can be placed anywhere within a cyclic TDM frame, and the data will still get through to a Gateway 120 (or equivalently, to a buffering on-board processor).

Finally, the beam hopping switch network 112 need not connect any given uplink cell 104 to a particular bandpass filter 128. Rather, it needs only to connect a given uplink cell 104 to any of several filters in the frequency domain concentrator 114 that have the same bandwidth and center frequency. This relaxed requirement allows a smaller network to do the job of a much larger matrix switch.

Group memberships are arranged orthogonally and pseudo-randomly. This has the benefit of minimizing the extent to which a heavy traffic load in a particular group "folds back" into the original group. For example, if the group memberships were arranged in rows and columns, sets of 64 cells would be isolated membership-wise from the other cells. If one group of 64 cells had a high traffic load and the other groups had lower loads, the switch network would not be able to help balance them by sharing loads. In the preferred embodiment, each cell is connected to each other cell through a maximum of 3 steps through group members. (i.e., given W and Z∃X and Y such that cell W is a co-member with cell X, which is a co-member with cell Y, which is a co-member with cell Z.) This "connectedness" of the groupings allows heavy loads to be separated and groups of cells that have similar loads to be gathered together.

An exemplary switch network 114 is disclosed in application Ser. No. 10/172,214, entitled "COMPACT HIGH-POWERBEAM HOPPING SWITCH NETWORK" by Keith Jarett and Andrew H. Kwon, filed Jun. 13, 2002, which application is hereby incorporated by reference herein. While the switch network of this related application is used for downlink beams rather than uplink beams as is the case in the instant invention, the same connectivity principles can be applied for application to an uplink antenna switch network.

The communication system 100 thus employs a combination of time division (beam hopping) and allocation of different bandwidths to each cell 104 in order to provide uplink capacities that can differ by large factors (up to roughly a factor of 100) from cell to cell.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of uplinking data, comprising the steps of:
(a) selecting a communications channel frequency domain bandwidth and a communications channel dwell time for receiving the data from a first plurality of ground stations disposed in a first cell;
(b) directing one or more of a plurality of receive antennae to the first cell and dwelling the one or more of the plurality of receive antennae on the first cell for the selected dwell time, to receive a first uplink transmission comprising the data from at least one ground station of the first plurality of ground stations disposed in the first cell at a time directed by information transmitted on an auxiliary channel in time slots and at frequencies that are pre-selected; and
(c) frequency domain bandfiltering the first uplink transmission by the selected communications frequency domain channel bandwidth;
wherein the communications channel frequency domain bandwidth and communications channel dwell time are selected according to a factor selected from the group comprising an uplink data rate requirement and a throughput utilization requirement.

2. The method of claim 1, further comprising the steps of:
(e) selecting a second communications channel frequency domain bandwidth and a second communications channel dwell time for receiving second data from a second plurality of ground stations disposed in a second cell;
(f) directing one or more of a second plurality of receive antennae to the second cell and dwelling the one or more of the second plurality of receive antennae on the second cell for the second communications channel dwell time, to receive a second uplink transmission comprising the second data from at least one ground station of the second plurality of ground stations disposed in the second cell; and
(g) frequency domain bandfiltering the second uplink transmission by the selected second communications channel bandwidth.

3. The method of claim 2, wherein steps (b)-(c) are performed concurrently with steps (f)-(g).

4. The method of claim 3, further comprising the steps of:
concatenating the frequency domain bandfiltered first uplink transmission and the frequency domain bandfiltered second uplink transmission in frequency; and
forwarding the concatenated and frequency domain bandfiltered first uplink transmission and frequency domain bandfiltered second uplink transmission to a second ground station.

5. The method of claim 4, wherein the second ground station is a gateway.

6. The method of claim 2, wherein:
the step of frequency domain bandfiltering the first uplink transmission by the selected communications channel bandwidth comprises the step of providing the first uplink transmission to a first filter having the selected communications channel bandwidth, the first filter being one of a plurality of filters implementing a plurality of contiguous bandwidths collectively forming a filter bank; and
the step of frequency domain bandfiltering the second uplink transmission by the selected second communications channel bandwidth comprises the step of providing the second uplink transmission to a second filter having the second communications channel bandwidth, the second filter being one of the plurality of filters implementing the plurality of contiguous bandwidths collectively forming the filter bank.

7. The method of claim 2, wherein the first uplink transmission is frequency domain bandfiltered to a first bandwidth and the second uplink transmission is frequency domain bandfiltered to a second bandwidth.

8. The method of claim 1, wherein the step of frequency domain bandfiltering the first uplink transmission by the selected communications channel bandwidth comprises the step of providing the first uplink transmission to a first filter having the selected communications channel frequency domain bandwidth, the first filter being one of a plurality of filters implementing a plurality of contiguous frequency domain bandwidths collectively forming filter bank, and the method further comprises the steps of:
concatenating the frequency domain bandfiltered first uplink transmission in frequency; and
forwarding the concatenated first uplink transmission to a second ground station.

9. The method of claim 1, wherein the time slots and frequencies of the auxiliary channel change as a function of time.

10. An apparatus for uplinking data, comprising:
selecting means for selecting a communications channel frequency domain bandwidth and a communications channel dwell time for receiving the data from a first plurality of ground stations disposed in a first cell;
directing means for directing one or more of a plurality of receive antennae to the first cell and dwelling the one or more of the plurality of receive antennae on the first cell for the selected dwell time, to receive a first uplink transmission comprising the data from at least one ground station of the first plurality of ground stations disposed in the first cell at a time directed by information transmitted on an auxiliary channel in time slots and at frequencies that are pre-selected; and
frequency domain bandfiltering means for frequency domain bandfiltering the first uplink transmission by the selected communications channel bandwidth;
wherein the communications channel frequency domain bandwidth and communications channel dwell time are selected according to a factor selected from the group comprising an uplink data rate requirement and a throughput utilization requirement.

11. The apparatus of claim 10, wherein:
the selecting means further selects a second communications channel frequency domain bandwidth and a second communications channel dwell time for receiving second data from a second plurality of ground stations disposed in a second cell;
the directing means further directs one or more of a second plurality of receive antennae to the second cell and dwells the one or more of the second plurality of receive antennae on the second cell for the second communications channel dwell time, to receive a second uplink transmission comprising the second data from the at least one ground station of the second plurality of ground stations disposed in the second cell; and
the frequency domain bandfiltering means further frequency domain bandfilters the second uplink transmission by the second communications channel frequency domain bandwidth.

12. The apparatus of claim 11, wherein the directing means further provides the second uplink transmission to a second filter of a filter bank.

13. The apparatus of claim 12, wherein:
the means for frequency domain bandfiltering the first uplink transmission by the selected communications channel frequency domain bandwidth comprises means for providing the first selected uplink transmission to a first filter having the communications channel frequency domain bandwidth, the first filter being one of a plurality of filters implementing a plurality of frequency domain bandwidths collectively forming a filter bank collectively spanning a frequency range; and
the means for frequency domain bandfiltering the second uplink transmission by the selected second communications channel frequency domain bandwidth comprises means for providing the second uplink transmission to a second filter having the second communications channel frequency domain bandwidth, the second filter being one of the plurality of filters implementing the plurality of frequency domain bandwidths collectively forming the filter bank collectively spanning the frequency range.

14. The apparatus of claim 11, wherein:
the selecting means selects the communications channel frequency domain bandwidth and the communications channel dwell time for receiving the data from the first plurality of ground stations disposed in the first cell, and concurrently, selects the second communications channel frequency domain bandwidth and the second communications channel dwell time for receiving second data from the second plurality of ground stations disposed in the second cell;
the directing means directs one or more of the plurality of receive antennae to the first cell and dwells the one or more of the plurality of receive antennae on the first cell for the selected communications channel dwell time, to receive the first uplink transmission comprising the data from the at least one ground station of the first plurality of ground stations disposed in the first cell, and concurrently, directs one or more of the second plurality of receive antennae to the second cell and dwells the one or more of the second plurality of receive antennae on the second cell for the selected second communications channel dwell time, to receive the second uplink transmission comprising the second data from the at least one ground station of the second plurality of ground stations disposed in the second cell; and
the frequency domain bandfiltering means frequency domain bandfilters the first uplink transmission by the selected communications channel frequency domain bandwidth, and concurrently, frequency domain bandfilters the second uplink transmission by the second communications channel frequency domain bandwidth.

15. The apparatus of claim 14, further comprising:
means for concatenating the frequency domain bandfiltered first uplink transmission and the frequency domain bandfiltered second uplink transmission in frequency; and
means for forwarding the concatenated and frequency domain bandfiltered first uplink transmission and frequency domain bandfiltered second uplink transmission to a second ground station.

16. The apparatus of claim 15, wherein the second ground station is a gateway.

17. The apparatus of claim 11, wherein the first uplink transmission is frequency domain bandfiltered to a first frequency domain bandwidth and the second uplink transmission is frequency domain bandfiltered to a second frequency domain bandwidth.

18. The apparatus of claim 11, wherein the means for frequency domain bandfiltering the first uplink transmission by the selected communications channel bandwidth comprises means for providing the first uplink transmission to a first filter having the selected communications channel frequency domain bandwidth, the first filter being one of a plurality of filters implementing a plurality of contiguous frequency domain bandwidths collectively forming filter bank, and the apparatus further comprises:
means for concatenating the frequency domain bandfiltered first uplink transmission in frequency; and
means for forwarding the concatenated first uplink transmission to a second ground station.

19. The apparatus of claim 10, wherein the time slots and frequencies of the auxiliary channel change as a function of time.

20. An apparatus for uplinking data, comprising:
a plurality of receive antennae, independently directable to a plurality of ground stations, each disposed in one of a plurality of cells;

a time domain concentrator, communicatively coupled to the plurality of receive antennae, the time domain concentrator for selectably directing each of the plurality of receive antennae to one or more of the plurality of cells to receive uplink transmissions at a time directed by information transmitted on an auxiliary channel in time slots and at frequencies that are pre-selected, and for concatenating each of the uplink transmissions in a time domain; and a frequency domain concentrator, communicatively coupled to the time domain concentrator, for concatenating the uplink transmissions in a frequency domain, wherein the frequency domain concentrator comprises at least one filter bank, the filter bank comprising a plurality of frequency domain bandpass filters, each frequency domain bandpass filter having a different frequency domain bandpass than the other of the plurality of frequency domain bandpass filters in the filter bank, and wherein the frequency domain bandpass filters collectively span a frequency range of the frequency domain concentrator.

21. The apparatus of claim 20, wherein the frequency domain bandpass filters redundantly collectively span the frequency range of the frequency domain concentrator.

22. The apparatus of claim 20, wherein the time domain concentrator comprises:

a plurality of interconnected fan-out splitters and fan-in combiners.

23. The apparatus of claim 22, wherein the plurality of interconnected splitters and combiners comprises:

a plurality of first fan-out splitters, for splitting signals received from each of the plurality of receive antennae;

a plurality of first fan-in combiners, communicatively coupled to the plurality of fan-out splitters, the plurality of first fan-in combiners for selectably combining the split signals;

a plurality of second fan-out splitters, communicatively coupled to the plurality of first fan-in combiners, the plurality of second fan-out splitters for splitting the selectably combined split signals;

a plurality of second fan-in combiners, communicatively coupled to the plurality of second fan-out splitters, the plurality of second fan-in combiners for selectably combining the split selectably combined split signals.

24. The apparatus claim 23, further comprising:

a plurality of cross bars, communicatively coupled to the plurality of second fan-in combiners and to the frequency domain concentrator.

25. The apparatus of claim 20, wherein the time slots and frequencies of the auxiliary channel change as a function of time.

* * * * *